Patented Jan. 16, 1951

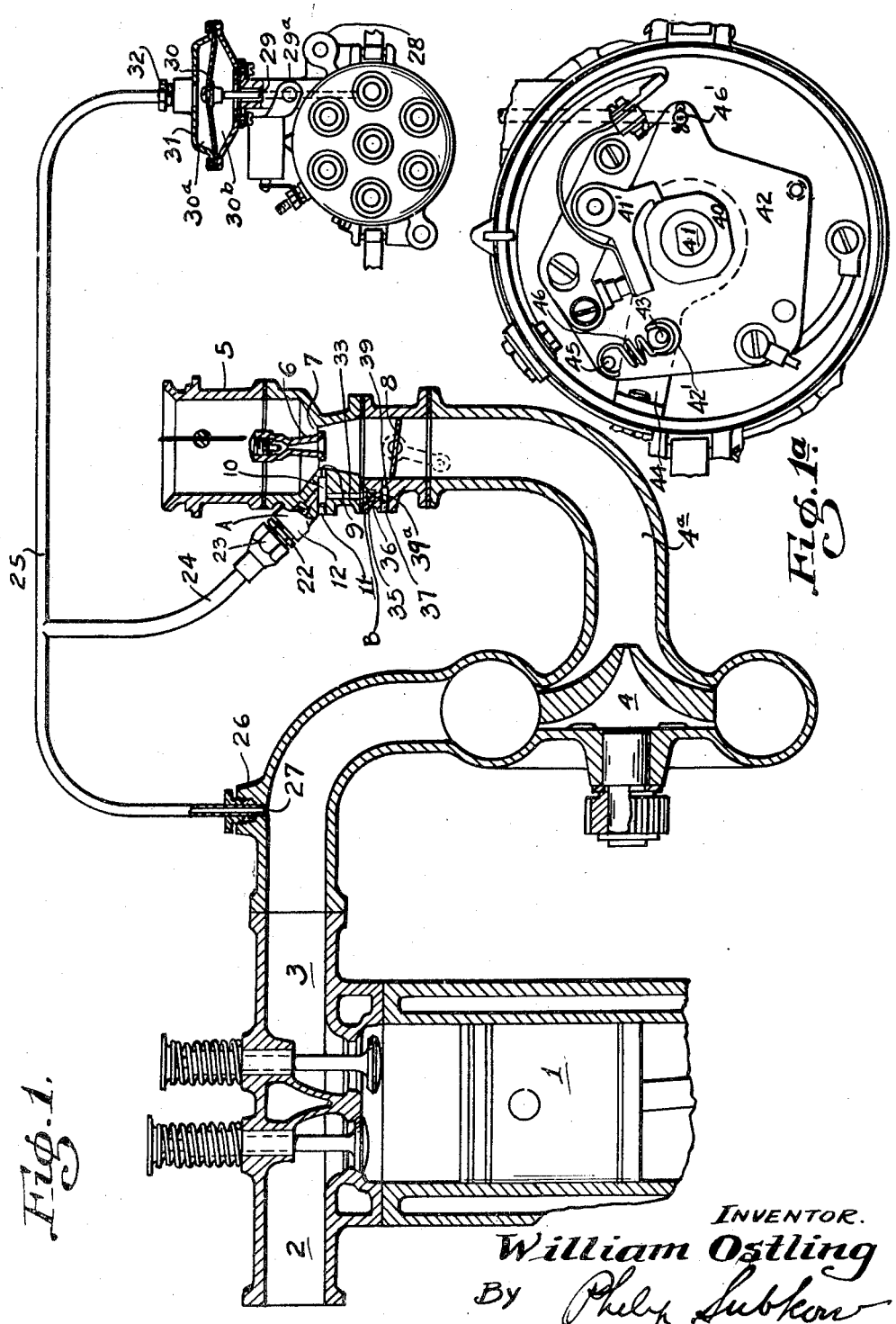

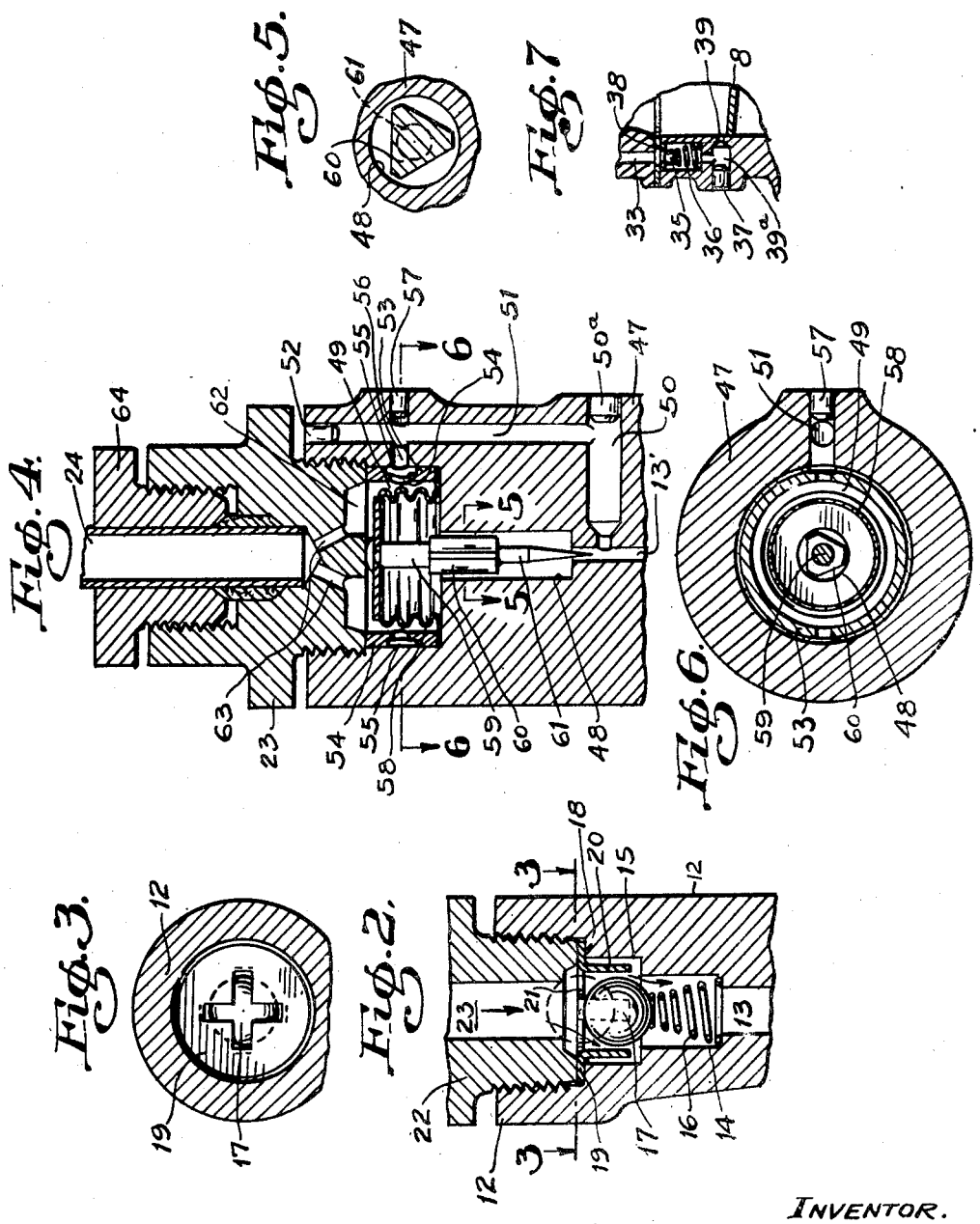

2,538,377

UNITED STATES PATENT OFFICE 2,538,377

AUTOMATIC SPARK CONTROL IN SUPERCHARGED SPARK IGNITION ENGINES

William Ostling, Los Angeles, Calif., assignor to California Machinery and Supply Co., Ltd., Los Angeles, Calif., a corporation of Delaware Application October 9, 1945, Serial No. 621,308

11 Claims. (Cl. 123—117)

This invention relates to carburetor and ignition timing mechanism for supercharged spark ignition engines.

In non-supercharged engines, where the manifold operates under vacuum, means have been suggested for the control of the spark advance in response to the vacuum existing in the manifold modified by that existing at the throat of the carburetor and at the throttle. Such devices are a substantial improvement over the spark advance controls depending on centrifugal governors or upon the spark advance depending upon either the manifold vacuum or that occurring at the throttle.

In supercharged spark ignition internal combustion engines, the supercharger is placed between the carburetor and the manifold. The manifold, unlike ordinary internal combustion engine operations, operates at a higher pressure than does the carburetor under all conditions of throttle position. Devices which depend on the vacuum in the manifold or upon a lower pressure in the manifold than in the carburetor are not applicable to such supercharged engines.

Supercharging of a spark ignition engine increases the tendency of the engine to detonate. The compression ratio of the engine is higher than the expansion ratio due to the supercharging pressure. An additional influence upon this increased tendency to detonate is the increase in temperature of the charge due to compression by the supercharger.

These effects are particularly noticeable when full throttle operation is considered. Thus, maximum horsepower output of the supercharged engines at full throttle at sea level cannot be maintained. Thus when the engine is started and the throttle is opened wide, the developed horsepower cannot be maintained indefinitely without failure of the engine. There is a much lower horsepower which can be maintained steadily by throttling the carburetor. This is the rated horsepower of the engine at sea level. As altitude is gained, power tends to fall off due to reduction in density of the air. Power may be maintained constant by opening the throttle as altitude is gained until a critical altitude is reached, where the throttle is wide open. From this point on developed power will drop proportionately with altitude.

The maintenance of the constant power up to the critical altitude is accomplished by opening the throttle as altitude is gained to maintain a constant manifold pressure until the critical altitude is reached. The reduction in the power output resulting from the part throttle operation is occasioned in part by the detonation which limits the development of power.

The suppression of detonation by proper spark control at full throttle operation is therefore of additional importance for the above reason in addition to the advantage of control of the spark advance at all throttle positions inherent in any spark ignition engine whether operating at high elevations or at sea level.

The importance of the effect of detonation at full throttle opening upon supercharged engines, particularly at sea level, is of like importance in ordinary ground vehicles employing supercharged engines as well as in supercharged airplane engines.

It is therefore an object of my invention to control the spark advance at all throttle positions of a supercharged spark ignition engine operating at a manifold pressure in excess of the carburetor pressure.

It is a further object of my invention to automatically hold the spark in retarded position during cranking and idling in such supercharged engines.

It is a further object of my invention to automatically advance the spark of such supercharged engines at part throttle operation at low R. P. M. of the motor, as, for instance, under road-load or cruising conditions.

It is a further object of my invention to retard the spark of such supercharged engines operating at road-load or flying with full throttle at low R. P. M. of the engine.

It is a further object of my invention to advance the spark in such supercharged engines operating at medium or high R. P. M.

It is an additional object of my invention to maintain the spark in such supercharged engines in retarded position until a predetermined minimum manifold pressure is obtained and to advance the spark in accordance with the increase in manifold pressure.

It is a further object of my invention to modify the advance or retard position of the spark in supercharged engines thus effected by the manifold pressure in accordance with the throttle position.

It is a further object of my invention to cause this modification of the advance or retard of the spark in supercharged engines effected by the manifold pressure in accordance with the lower pressure existing in the carburetor.

It is a further object of my invention to employ the lower pressure existing at the throat of the carburetor venturi to modify the effect of the manifold pressure of a supercharged engine on the degree of spark advance.

It is an additional object of my invention to employ the pressures existing in the fuel conduit at the throttle to modify the degree of spark advance or retard effected by the manifold pressure existing in a supercharged engine.

It is a further object of my invention to employ the lower pressures existing both in the venturi throat of the carburetor and at the throttle to modify the effects of the manifold pressure existing in a supercharged engine on the degree of spark advance.

Further objects will be apparent to those skilled in the art from the description of the preferred embodiments of my invention taken together with the drawing, in which Fig. 1 is a view partly in section, showing the assembly of my improved distributor and carburetor;

Fig. 1a shows the structure of the distributor 28 with the cover removed;

Fig. 2 is a section of a detail of one of the valves shown in Fig. 1;

Fig. 3 is a plane view of a ball retainer shown in section in Fig. 2;

Fig. 4 is a sectional view of a modification of the valve shown in Fig. 2;

Fig. 5 is a section taken on line 5—5 of Fig. 4;

Fig. 6 is a section taken on line 6—6 of Fig. 4; and

Fig. 7 is a detail of another of the valves shown in Fig. 1.

Referring to Fig. 1, 1 is a spark ignition internal combustion engine having the usual exhaust conduit 2, inlet manifold conduit 3, connected to a supercharger (shown as a rotary compressor) 4 and to carburetor 5. As is conventional with such carburetors, it has a fuel jet 6 and venturi 7 positioned above the fuel throttle 8. An orifice 9 positioned at the throat of the venturi 7 communicates with a conduit 10 sealed by a plug 11. A boss 12 formed in the side of the carburetor has a communicating conduit 13 and enlarged chamber 14 carrying spring 16 and communicating with valve chamber 15 in which is positioned a check ball valve 17. The boss 12 is also formed with an enlarged bore into which is set a fitting 22. Between fitting 22 and shoulder 18 is set a valve retainer 21 formed of a disc 19 in which a cross 21 is formed by punching out the depending brackets 20 which guide the ball in the bore 15. This assembly forms a valve mechanism, hereinafter called valve A, which closes by seating of the ball against the seat in bore 15.

Attached to fitting 22 is a compression type fitting 23 in which is positioned a tube 24 which communicates with tube 25 fitting in boss 26 on manifold 3 and communicating therewith. The other end of the tube 25 communicates with distributor 28 by means of fitting 32 in diaphragm chamber 31. In diaphragm chamber 31 is positioned a flexible diaphragm 30 to which is attached a rod 29 passing through the fitting 29a of the distributor. This forms a pressure chamber 30a and a chamber 30b at atmospheric pressure.

Referring to the carburetor, a by-pass 33 is formed in the wall of the carburetor. A check valve 35 operates against a spring 36 against a seat 38 to cut off communication with passageway 39a in which is seated plug 37. This assembly is hereinafter called valve B.

The distributor is of the conventional type modified as described herein to adapt it to the automatic pneumatic advance of my invention. It is provided with a cam 40 of usual design operating on shaft 41. Around the shaft is rotatably mounted a breaker plate 42 carrying the conventional breaker 41. This breaker plate, in order to adapt it to my invention, is formed with an upstanding pin 45 and a hole 42′ through which protrudes a pin 43 positioned in the adjustable plate 44 mounted on the casing distributor 28. A spring 46 is mounted between pins 43 and 45. The rod 29 is connected to plate 42 by a hinge 46′.

Figs. 4 to 6 show a modification of valve 17. The boss 47 similar to 17 and formed in the carburetor casing contains the passageway 13′ similar to the passageway 13 in Fig. 1. Passageway 13′ communicates with the enlarged bore 48 which in turn communicates with the enlarged chamber 49. A cross bore 50 sealed with plug 50a communicates with the vertical bore 51 which is sealed by plug 52 and with bore 13′ below the needle valve. Vertical bore 51 communicates with cross bore 56 which is sealed by plug 57. Positioned in chamber 49 is a sleeve 53 formed with a circumferential channel 55 and orifices 54. Positioned within chamber 49 is a bellows 58 anchored at its bottom to the bottom of chamber 49 and its top filed to move up or down. Mounted on the bellows 58 is a pin 59 which carries an enlarged portion of the triangular cross-section which enters chamber 48 and a needle metering point 61 which enters passageway 13′.

The chamber 49 is closed by fitting 23 which carries a circumferential channel 62 and bores 63 to form a communication between channel 62 and the conduit 24 which is held gas-tight by fitting 64.

The operation of valve A (Fig. 2 or its modification shown in Fig. 4) will be understood from the following. In the form shown in Fig. 2, whenever the pressure in conduit 24 is greater than in passageway 13 by an amount sufficient to overcome the spring 16, valve A will close by seating of the ball check against the seat in chamber 15. In Fig. 4, as the pressure in 24 rises above the pressure in 13′, this pressure is bled through 54, 55, 56, 51, 50, and into 13′. Whenever the pressure differential is sufficiently great that the pressure drop between 24 and 13′ becomes sufficiently large to overcome the bellows 58, the needle valve enters further into the passageway 13′ increasing the pressure differential between 50 and 13′, thus positively seating the needle 61 to close the valve.

The operation of the device is as follows:

With the engine idle and atmospheric pressure in line 25 and in the carburetor, valve A is open with the ball check valve 17 against the retainer 21, but because of the cross 21 communication is open between 23 and 13. The valve B is fully closed, the spring seating the ball check against the seat 38. With atmospheric pressure in chambers 30a and 30b, the spring 46 keeps the breaker plate 42 in the extreme counter-clockwise position, with the pin 43 against the wall of hole 42′, as shown in Fig. 1. In this position the spark is fully retarded.

When the engine is cranked or when idling, the throttle 8 is at idling position, the orifice 39 is on the venturi side of the throttle. The supercharger is rotating at a relatively low speed and the positive pressure in manifold 3 is relatively low as well as is the vacuum in line 4a. The velocity of the air past orifice 9 and 39 is low. As a consequence the pressure differential across the valve A is insufficient to close the valve A and also the pressure differential across the valve B is insufficient to open valve B. The supercharger pressure developed in 3 is at this point insufficient to move the diaphragm 30 and rod 29 downward to cause an advance of the spark by clockwise rotation of the breaker plate against the tension of the spring 46 and the distributor is at maximum retard at which it is set by the zero setting of the angularly adjustable plate 44.

As the throttle 8 is opened wider to part throttle operation, the engine speeds up moderately but not to maximum R. P. M. and the orifice 39 is placed on the supercharger side of the throttle 8. As the engine speeds up, the supercharger speeds up increasing the positive pressure in 3 and increasing the vacuum in 4a. The air-flow past the orifice 9 is at increased velocity over the velocity at idling, thus decreasing the pressure at orifice 9. At the same time, the vacuum at orifice 39 is increased since it is now in direct communication with the supercharger suction.

The vacuum at orifice 39 is greater than at 9 and consequently the pressure in passageway 33 is greater than in 39a and the valve B opens. This causes the pressure in 13 to drop by bleeding through by-pass 33 through orifice 39.

The drop in pressure in 10 taken together with the rise in pressure in 3 and line 25 causes valve A to seat, since the pressure differential across valve A is sufficient to overcome spring 16. The chamber 30 is under high pressure of the manifold caused by the increase in engine speed resulting from part opening the throttle. This increase in pressure at low speeds, depending upon the spring constant of spring 46, will advance the spark to part advance and in the desired degree by rotating the cam plate in a clockwise direction resulting from the downward movement of the rod 29. The degree of advance thus resulting at part throttle operation under relatively low speed can be set by proper choice of the spring or by adjustment of the zero setting of the plate 44 in the distributor and the diameter of the hole 42 to give any desired degree of spark advance.

The condition occurring at full throttle operation and at relatively high speed, i. e., road-load or full throttle cruising conditions, is as follows: As the throttle is opened wide, the engine speeds up and the pressure in the manifold 3 increases. Since, however, the line 4a is open directly to the atmosphere through the carburetor, vacuum falls in 4a and also at orifice 39, which is now at a lower vacuum than is present in the throat of the venturi. This results in a lower pressure at 9 than at 39. The pressure in 39a is greater than in 10 and the valve B is closed. The pressure in 10 is now greater than occurred at part throttle, but insufficient to cause an opening of the valve B against the higher pressures in 3 and therefore 25, resulting from the speeding up of the supercharger. The chamber 30 being under the higher pressure in 25, the breaker plate is in the fully advanced position as determined by the diameter of the hole 42. The degree of advance at such full open throttle condition can be adjusted by the zero setting of 44.

With wide open throttle under cruising or road-load conditions with full throttle, the unstable region of engine performance may be reached, as described above. Under these conditions where detonation is an influencing factor, the speed of the engine falls and, consequently, so does the pressure developed in 3. With valve A closed, the fall of pressure in 3 and therefore 25 causes a fall in pressure in 30 and the breaker plate is rotated counter-clockwise automatically retarding the spark to overcome the detonation. As a result the stable maximum speed is maintained at a higher level.

The condition under full load operation, as, for instance, on acceleration or climbing or lugging, where the throttle is wide open, results in a fall of engine speed and consequently, also, the fall of supercharger discharge pressure in 3. Under these conditions valve A is closed and the pressure drop in 30a causes a retard of the spark by the counter-clockwise rotation of breaker plate by spring 46.

While I have described a particular embodiment of my invention for the purpose of illustration, it should be understood that various modifications and adaptations thereof may be made within the spirit of the invention as set forth in the appended claims.

I claim:

1. A carburetor for spark ignition internal combustion engines, comprising an inlet conduit, an air inlet into said conduit, a fuel inlet into said conduit, a throttle, an outlet conduit connecting said carburetor to the engine, a restriction in said carburetor between said throttle and said air inlet, a third conduit connected to said first-mentioned conduit at said restriction, means for connecting said third conduit with the manifold of a supercharged engine, and a valve in said third conduit, said valve being adapted to close whenever the pressure on the manifold side of the valve is greater than on the carburetor side of the valve by a predetermined amount.

2. A carburetor for spark ignition internal combustion engines, comprising an inlet conduit, an air inlet into said conduit, a fuel inlet into said conduit, a throttle, an outlet conduit for connecting said carburetor to the engine, a restriction in said carburetor between said throttle and said air inlet, a third conduit connected at said restriction, means for connecting said third-mentioned conduit with the manifold of a supercharged engine, a valve in said third conduit, said valve being adapted to close whenever the pressure on the manifold side of the valve is greater than on the carburetor side by a predetermined amount, and a by-pass conduit connected to said third conduit between the said valve and said restriction and connected to said throttle and so positioned that said conduit connects with the carburetor side of said throttle in closed position and with the outlet side of said throttle in part open position.

3. A carburetor for spark ignition internal combustion engines, comprising an inlet conduit, an air inlet into said conduit, a fuel inlet into said conduit, a throttle, an outlet conduit for connecting said carburetor to the engine, a restriction in said carburetor between said throttle and said air inlet, a third conduit connected at said restriction, means for connecting said third-mentioned conduit with the manifold of a supercharged engine, a valve in said third conduit, said valve being adapted to close whenever the pressure on the manifold side of the valve is greater than on the carburetor side, a by-pass conduit connected to said third conduit between the said valve and said restriction and connected at said throttle and so positioned that said conduit connects with the carburetor side of said throttle in closed position and with the discharge side of said throttle in part open position, and a second valve in said by-pass conduit, said second valve opening when the pressure in the by-pass conduit on the throttle side of the second valve is less than the pressure in said third conduit by a predetermined amount.

4. Means for controlling the advance of the spark of spark ignition internal combustion engines, including a carburetor comprising an inlet conduit, an air inlet into said conduit, a fuel inlet into said conduit, a throttle, an outlet conduit for connecting said carburetor to the engine, a restriction in said carburetor between said throttle and said air inlet, a third conduit connected at said restriction, means for connecting said third conduit with the manifold of a supercharged engine, a valve in said third conduit, said valve being adapted to close whenever the pressure on the manifold side of the valve is greater than on the carburetor side by a predetermined amount, a by-pass conduit connected to said third conduit between the said valve and said restriction and connected at said throttle and so positioned that the conduit connects with the carburetor side of said throttle in closed position and with the discharge side of said throttle in part open position, a second valve in said by-pass conduit, said second valve opening when the pressure in the by-pass conduit on the throttle side of the second valve is less, by a predetermined amount, than the pressure in said third conduit, and a distributor including means for advancing and retarding the spark comprising a pneumatically operated mechanism, a fourth conduit connecting said mechanism to the third conduit, said mechanism being responsive to the pressure in said fourth conduit to adjust the degree of spark advance.

5. A carburetor for spark ignition internal combustion engines, comprising an inlet conduit, an air inlet to said conduit, a fuel inlet to said conduit, a throttle, an outlet conduit connecting said carburetor to the engine, a restriction in said carburetor between said throttle and said air inlet, a third conduit connected to said carburetor at said restriction, a valve positioned in said third conduit, the third conduit on one side of said valve communicating with the carburetor and the third conduit on the opposite side of said valve being adapted for connection to the discharge of a supercharger, said valve being adapted to close whenever the pressure on the carburetor side of said valve nearest the restriction is less than on the opposite side of said valve by a predetermined amount.

6. A carburetor for spark ignition supercharged internal combustion engines, comprising an inlet conduit, an air inlet to said conduit, a fuel inlet into said conduit, a throttle, an outlet conduit connecting said carburetor to the engine, a restriction in said carburetor between said throttle and said air inlet, a third conduit connected to said restriction, a valve in said third conduit, the third conduit on one side of said valve communicating with the carburetor and the third conduit on the opposite side of said valve being adapted for connection to the discharge of a supercharger, said valve being adapted to close whenever the pressure in said conduit on the carburetor side of said valve nearest the restriction is less, by a predetermined amount, than on the opposite side of said valve, a by-pass conduit connected to said third conduit between said valve and said restriction and connected to said throttle and so positioned that said conduit connects with the carburetor side of said throttle in closed position and with the outlet side of said throttle in part open position.

7. A carburetor for spark ignition internal combustion engines, comprising an inlet conduit, an air inlet into said conduit, a fuel inlet into said conduit, a throttle, an outlet conduit for connecting said carburetor to the engine, a restriction in said carburetor between said throttle and said air inlet, a third conduit connected to the carburetor at said restriction, a valve in said third conduit, the third conduit on one side of said valve communicating with the carburetor and the third conduit on the opposite side of said valve being adapted for connection to the discharge of a supercharger, said valve being adapted to close whenever the pressure on the side of said valve nearest the carburetor is less, by a predetermined amount, than on the opposite side of said valve, a by-pass conduit connected to said third conduit between said valve and said restriction and connected to said throttle and so positioned that said conduit connects with the carburetor side of said throttle in closed position and with the discharge side of said throttle in part open position, and a second valve in said by-pass conduit, said second valve opening when the pressure in the by-pass conduit on the throttle side of said valve is less, by a predetermined amount, than the pressure in said third conduit.

8. A device for automatically adjusting the spark in a supercharged spark ignition engine, comprising a pneumatically actuated spark advance mechanism composed of a pressure responsive device, means connected to said pressure responsive device for connecting said pressure responsive device to the circuit breaker of a spark advance mechanism, a carburetor for a supercharged spark ignition internal combustion engine, an orifice in said carburetor positioned in respect of said throttle in said carburetor so that the orifice is on the carburetor side of the throttle when said throttle is in closed position and on the manifold side of said throttle when said throttle is in open position, said carburetor containing also a restriction between the air inlet and said throttle, a by-pass conduit connected to said carburetor at said restriction and to said orifice, a valve in said by-pass, said valve opening when the pressure at said restriction is greater by a predetermined amount than at said orifice, and a second by-pass connecting said first by-pass to the discharge from said supercharger, said valve in said second by-pass being adapted to close whenever the pressure in said supercharger is greater than in said first-mentioned by-pass by a predetermined amount.

9. A device for automatically adjusting the spark in a supercharged spark ignition engine, comprising a pneumatically actuated spark advance mechanism composed of a pressure responsive device and means for connecting said device to the circuit breaker of a spark advance mechanism, a fuel and air induction system comprising a fuel induction nozzle and an air conduit, a supercharger, and an inlet manifold for said spark ignition engine, a throttle in said induction system between said fuel nozzle and said manifold, an orifice in said induction system positioned in respect to said throttle so that it is on the air inlet side of said throttle when the throttle is in closed position and on the manifold side of said throttle when the throttle is in part open position, a restriction in said induction system, an orifice in said induction system positioned at said restriction, a by-pass connection between said orifices, a conduit connected to said by-pass and to said pressure responsive device and to said induction system at the discharge of said supercharger, and a valve in said conduit between said connection and the by-pass and the connection to said discharge and to said pressure responsive device, said valve being adapted to close whenever the pressure in said supercharger discharge is greater by a predetermined amount than in said by-pass.

10. A carburetor for spark ignition supercharged internal combustion engines, comprising an inlet conduit, an air inlet to said conduit, a fuel inlet into said conduit, a throttle, an outlet conduit connecting said carburetor to the engine, a restriction in said carburetor between said throttle and said air inlet, a third conduit connected to said restriction, a valve in said third conduit responsive to the difference in pressure at said restriction and in said conduit on the opposite side of said valve, means for maintaining said valve in open position at all values of said difference less than a predetermined amount, said means also closing said valve at all values of said pressure difference greater than said predetermined amount, a by-pass conduit connected to said third conduit between said valve and said restriction and connected to said throttle and so positioned that said conduit connects with the carburetor side of said throttle in closed position and with the outlet side of said throttle in part open position.

11. A carburetor for spark ignition internal combustion engines, comprising an inlet conduit, an air inlet into said conduit, a fuel inlet into said conduit, a throttle, an outlet conduit for connecting said carburetor to the engine, a restriction in said carburetor between said throttle and said air inlet, a third conduit connected to the carburetor at said restriction, a valve in said third conduit responsive to the difference in pressure at said restriction and in said conduit on the opposite side of said valve, means for maintaining said valve in open position at all values of said difference less than a predetermined amount, said means also closing said valve at all values of said pressure difference greater than said predetermined amount, a by-pass conduit connected to said third conduit between said valve and said restriction and connected to said throttle and so positioned that said conduit connects with the carburetor side of said throttle in closed position and with the discharge side of said throttle in part open position, and a second valve in said by-pass conduit, said second valve opening when the pressure in the by-pass conduit on the throttle side of said valve is less, by a predetermined amount, than the pressure in said third conduit.

WILLIAM OSTLING.

REFERENCES CITED

The following references are of record in the file of this patent:

UNITED STATES PATENTS

| Number | Name | Date |
| --- | --- | --- |
| 2,365,313 | Udale | Dec. 19, 1944 |
| 2,365,768 | Mallory | Dec. 26, 1944 |
| 2,380,967 | Jarvis | Aug. 7, 1945 |
| 2,383,898 | Udale | Aug. 28, 1945 |
| 2,384,692 | Olson et al. | Sept. 11, 1945 |